United States Patent [19]

Werner et al.

[11] Patent Number: 4,730,876
[45] Date of Patent: Mar. 15, 1988

[54] APPARATUS FOR MANUFACTURING A BRUSH SEAL

[75] Inventors: Klemens Werner, Munich; Horst Berger, Lochham; Herbert Merz, Munich; Thomas Schunn, Emmering, all of Fed. Rep. of Germany

[73] Assignee: Motoren- und Turbinen Union Munchen GmbH, Munich, Fed. Rep. of Germany

[21] Appl. No.: 892,189

[22] Filed: Jul. 31, 1986

[30] Foreign Application Priority Data

Jul. 31, 1985 [DE] Fed. Rep. of Germany ....... 3527499
Feb. 27, 1986 [DE] Fed. Rep. of Germany ....... 3606284

[51] Int. Cl.$^4$ ............................................... A46D 1/08
[52] U.S. Cl. ................................. 300/2; 140/92.2
[58] Field of Search ........................... 300/2, 4–11, 300/3, 21, 19; 72/143; 140/92.2

[56] References Cited

U.S. PATENT DOCUMENTS

| | | | |
|---|---|---|---|
| 2,242,444 | 5/1941 | Altenbern et al. | 300/21 |
| 2,449,668 | 9/1948 | Peterson | 300/21 |
| 3,689,117 | 9/1972 | Hules | 300/21 |
| 4,204,629 | 5/1980 | Bridges | 300/21 X |

*Primary Examiner*—Mark Rosenbaum
*Attorney, Agent, or Firm*—Roberts, Spiecens & Cohen

[57] ABSTRACT

An apparatus for manufacturing a brush-type seal comprising wrapping a filament over two spaced elongated mandrels in parallel arrangement to form a filament packing, then securing the filament packing at its ends onto the two mandrels, thereafter dividing the filament packing in a median plane between the mandrels to produce two brushes which are then bent into the desired brush shape. The bristles can be formed at an inclination in their mountings by supporting the mandrels on the base beams of a parallelogram linkage which can be displaced and controlled by cam disks so that the length of winding of the filament remains constant.

4 Claims, 13 Drawing Figures

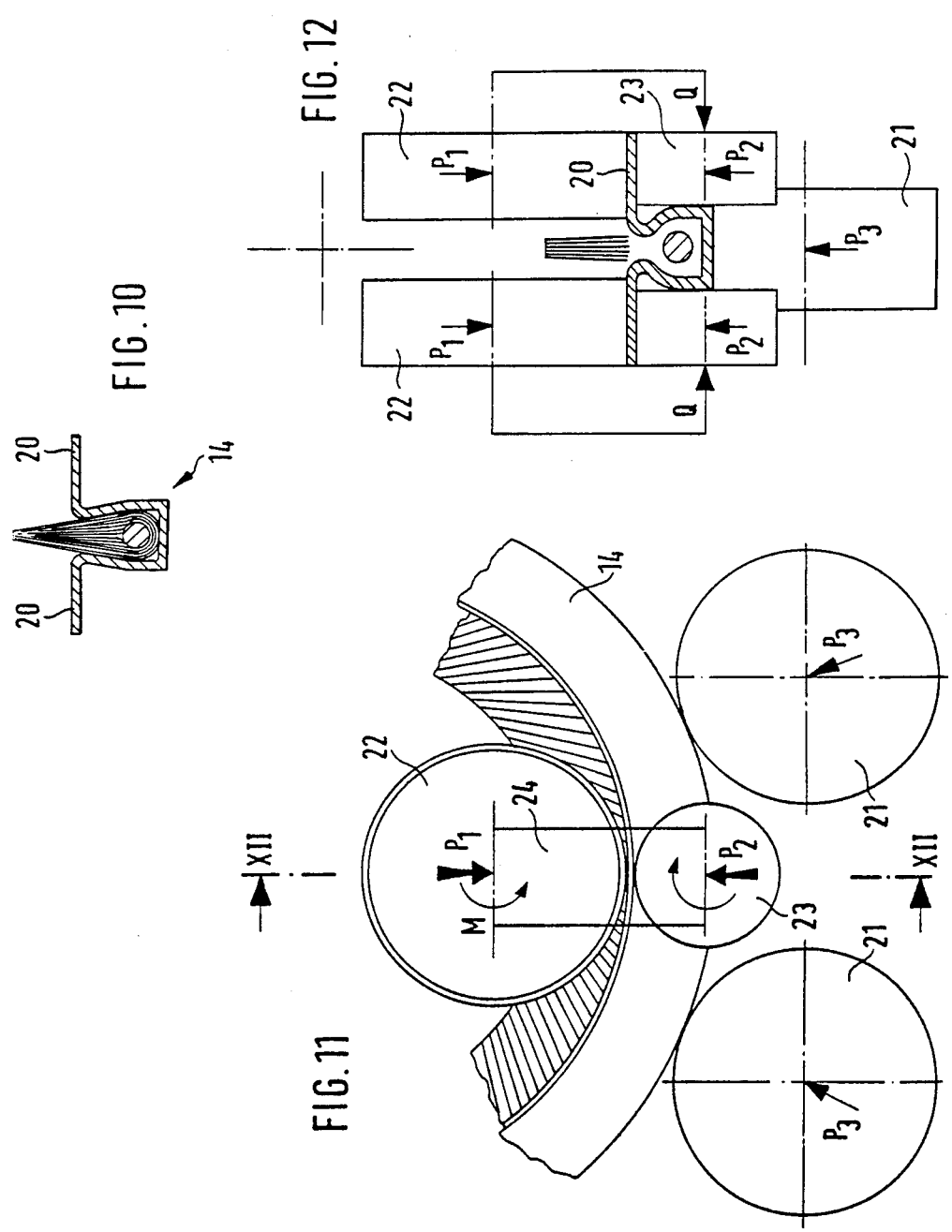

APPARATUS FOR MANUFACTURING A BRUSH SEAL

FIELD OF THE INVENTION

This invention relates to apparatus for manufacturing a brush seal whose bristles are secured in a preferably annular mounting by wrapping a filament of bristle material over a core, installing the mounting to partially enclose the wrapped filament packing, and cutting the filament packing such that free bristle ends are produced.

PRIOR ART

A method for manufacturing a seal of the known-type is disclosed in German Patent DE-PS No. 28 30 839 and corresponding U.S. Pat. No. 4,204,629. In this method, elements used to mount the bristles are partially included in the wrapping core and partially positioned externally over the wrapped filament packing. This produces a core of complex structure deriving from a comparatively time-consuming manufacturing technique.

A further disadvantage of the known method is that a considerable portion of the wrapped filament must be scrapped after it is cut. Since the bristle materials used are expensive, the manufacturing cost of the brush seal is relatively high.

SUMMARY OF THE INVENTION

An object of the present invention is to provide apparatus for the mass production of brush seals which employs simple manufacturing means and economizes material usage.

It is a particular object of the present invention to provide apparatus which carries out the following process operations:

(A) wrapping a filament of bristle material around two elongated spaced mandrels in parallel arrangement to produce a dense filament packing of substantially oval cross-section, (B) securing the filament packing to the two mandrels by mounting clamping strips on the ends of the packing around the mandrels, (C) dividing the filament packing along a median plane between the mandrels such that two opposed straight brushes are produced having bristles of substantially equal length, and (D) bending the straight brushes into a desired brush contour, preferably along circular arcs, and joining the ends together to form a closed ring.

A major advantage afforded by the present invention is that the wrapped bristle material is utilized with practically no waste caused by the cutting.

Another advantage of the present invention is that it permits the manufacture of brush seals of a great variety of geometric shapes by bending the brushes to the contour desired. Thus, in the manufacture of annular brush seals a pair of brushes of a length equal to one-half the circumference of the finished brush seal can simultaneously be bent into semicircles and joined together at their ends to form the desired annular seal.

In an alternative arrangement, one brush of a length equal to the full circumference of the intended annular seal is bent into ring shape and the two abutting ends of the bent brush are united by welding or brazing to form the circular brush seal.

A further advantage of the present invention is that starting with the straight brush, annular seals can be formed that have bristles extending either radially inward or outward.

For the formation of both types of annular seals described above, it may be desirable to add the following process operations at the end of operation D):

(E) applying and joining a second bristle mounting over the free ends of the bristles, and (F) cutting the bristle ends attached to the clamping strip.

In this embodiment of the invention, the clamping strip used to clamp the filament packing mandrel is not employed as the mounting of the final brush seal, which may be advantageous when the brush seal dimensions must be very precise. The second bristle mountings can be designed such that they are suitably finished, particularly by turning or grinding, both before they are joined with the bristles and thereafter.

In a further aspect of the present invention, the bristles are given an inclination in their mounting by wrapping the filament in a plane which extends normal to the plane formed by the mandrels and at a pitch angle $\gamma$ with the longitudinal direction of the mandrels. This produces brush shapes whose bristles no longer extend in a direction normal to the mandrels or the clamping strip thereon, but rather at an inclination, so that when the brushes are processed to form annular seals, the bristles no longer extend radially but at any desired angular deviation from the radial direction. These brush seals with inclined bristles are useful for sealing high-speed components in relative rotation with one another.

In a further, especially beneficial aspect of the present invention, the inclination of the bristles in their mounting is achieved by longitudinally offsetting the wrapped mandrels relative to one another at a time preceding operation B). In that case the need for changing the wrapping plane is obviated.

In order to locate the bristles in their mounting regardless of whether this be the clamping strip proper or a second mounting installed subsequently, it may be helpful to wrap layers of adhesive or brazing foil into the filament packing in the end regions whereat the filaments are wrapped on the mandrels, depending on the type of bristle material being used.

In a further aspect of the present invention, the single filament can be replaced by a strand of filaments or with a ribbon-shaped unidirectional fabric having an easily removable weave filling. This reduces the wrapping time or gives greater strength of the brush for the same amount of wrapping time.

An advantage is provided also when following the process operation (E) the rear face, especially the circumferential surface of the bristle mounting, is machine finished.

In the event that metallic brush material is used, and especially when the bristles have been inclined by longitudinally offsetting the mandrels with respect to each other, it may be advantageous to subject the metal wire filament packing to heat treatment before commencing the cutting operation. This will give the desired high degree of uniformity in the orientation of the individual metal bristles and the intended alteration of the properties of the material, such as flexibility or hardness.

Where use is made of clamping strips to secure the filament packing on either mandrel, it is desirable if the strips have a U or hat-shaped section. Either profile will exert considerable clamping force on the filament packing.

The use of a hat-shaped profile is advantageous, especially when the clamping strip proper is intended to be the final mounting for the brush seal. This is because the rims of the hat-shaped section can then be gripped between the rollers of a roller bending machine to give the rims an intended circular arc form in simple and rapid fashion.

In a further advantageous aspect of the present invention the clamping strip is in the form of a sleeve of circular shape.

In a still further aspect of the present invention, the filament packing on the two mandrels is located, not by clamping strips, but by a pourable or brushable curing material, preferably a resin. The installation of the clamping strips in accordance with process operation (B), then, is omitted and the curing material is poured or brushed on instead to effectively form the clamping strips in situ.

If the brush material is ceramic or metallic, a metallic hardening agent, such as a suitable brazing alloy, can be used to secure the packing on the mandrels.

The invention also contemplates apparatus for producing brushes with bristles extending at an angle to form the mountings in which said apparatus comprises a wrapping frame in the form of a hinged parallelogram frame having base beams which permit parellel displacement relative to one another and on which the filament is wrapped, and cross beams which undergo parallel displacement such that the wrapping length of each filament turn remains constant.

When the filament is being wrapped, the hinged parallelogram frame is displaced to form a rectangle such that when the wrapping is complete and before the filament packing is clamped onto the mandrels at its ends, a parallel displacement of the base beams will give the bristles an inclination in their mounting. In the process, slipping of the filament packing from its intended position is prevented by applying moderate clamping force on the filament packing. This can be achieved by constructing the cross-beams as telescopic clamping elements.

In a further aspect of the present invention, cam disks are attached at their chordal edges to the base beams such that when the base beams are longitudinally displaced relative to one another, the surfaces of the cam disks slide on one another, the cam profile being selected to keep the length of one wrapping turn constant over the entire length of relative travel of the base beams.

BRIEF DESCRIPTION OF THE FIGURES OF THE DRAWING

FIG. 10 is a sectional view of a brush seal having a clamping strip of hat section.

FIG. 11 diagrammatically illustrates a schematic arrangement of a roller bending apparatus for deforming brush seals in accordance with FIG. 10.

FIG. 12 is a cross-sectional view taken on line XII—XII in FIG. 11.

DETAILED DESCRIPTION OF PREFERRED EMBODIMENTS

Figure 1:
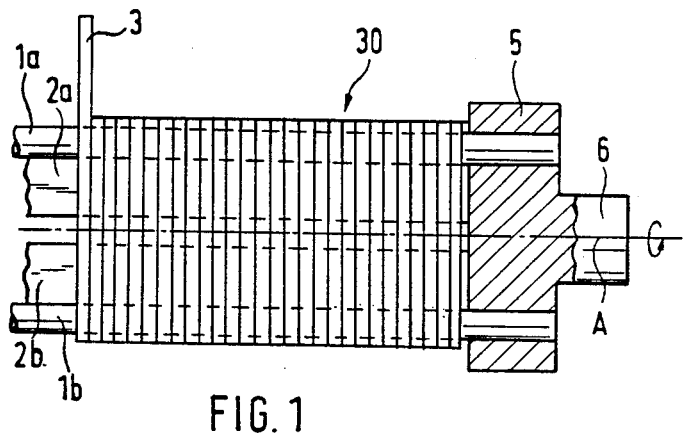
FIG. 1 is an elevational view, partly in section, of one end of an apparatus for wrapping a filament over a frame.

FIG. 1 shows the forming of a dense filament packing 30 by wrapping a continuous fiber 3 around two spaced, parallel elongated mandrels 1a, 1b which are secured at their ends in clamping heads 5 and are rotated about an axis A by driving a shaft 6 in rotation. The mandrels 1a, 1b normally are thin wires supported by shaped members 2a, 2b to keep the wires from deflecting. The mandrels 1a, 1b and the filament 3 are shown considerably thicker than they would be in reality. The filaments are normally 20 to 80 micrometers in diameter.

Figure 2:
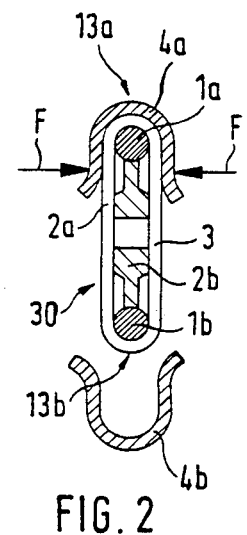
FIG. 2 is a transverse cross-sectional view taken through the apparatus in FIG. 1 with the addition of clamping strips.
Figure 3:
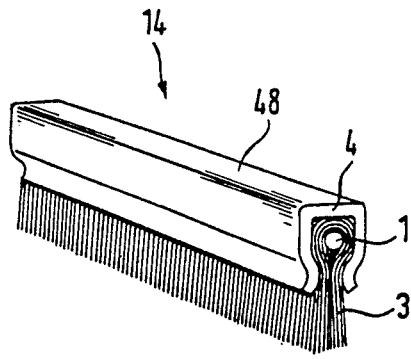
FIG. 3 is a perspective view of a brush seal obtained from the arrangement in FIG. 2.

FIG. 2 shows the installation of clamping strips 4a, 4b on the ends 13a and 13b of the filament packing 30 when the packing has been fully wrapped, i.e. fiber 3 has been wound on the mandrels 1a, 1b over the entire length of the mandrels. The clamping strips 4a, 4b are resilient and when installed on the ends of the packing exert a clamping force on the packing 30 in the direction of the arrows F, which clamping force can be supplemented by application of an external squeezing force. As a result, the clamping strips 4a, 4b, the filament packing 30 and the respective mandrels 1a and 1b form an assembled composite body. The composite body is then divided along a median horizontal plane by cutting the wrapped fibers 3 along said plane to form two separate members, one of which is shown in FIG. 3 and thereafter referred to as brush 14. The filaments 3 in brush 14 form bristles whose cut ends are free.

The brush 14 can be bent into any desired contour, preferably annular. The bending operation can be such that the rear face 48 of the clamping strip 4 becomes the inner circumferential surface and the bristles 3 are directed radially outward, or inversely, the rear face 48 of the clamping strip 4 becomes the outer circumferential surface and the bristles are directed radially inward. The latter configuration is illustrated in fragmentary view in FIG. 4.

Figure 4:
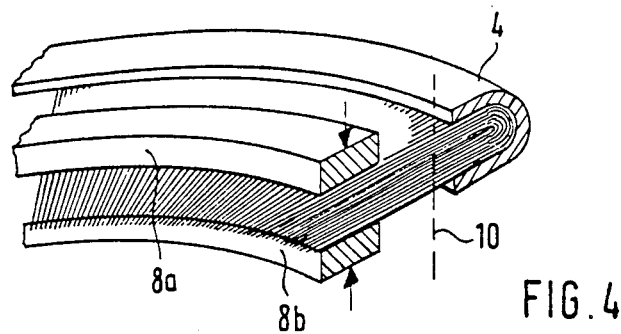
FIG. 4 is a fragmentary view which diagrammatically illustrates, on enlarged scale, the forming of a brush to a curved shape.

As also seen in FIG. 4 a second bristle mount or support in the form of rings 8a, 8b is engaged over the free ends of the bristles. As indicated by the arrows in FIG. 4, the bristles can be clamped tightly between the rings 8a, 8b of the second bristle support and fixedly joined therewith by suitable means, such as welding or brazing in the case of metal bristles or cementing or brazing in the case of ceramic bristles. The inside diameter of the rings 8a, 8b in FIG. 4 is intended to be the final mating diameter for the finished brush seal and can be machined to accurate size both before and after connection to the ends of the bristles. Any projecting bristle ends are simultaneously machined to proper length. Thereafter, the clamping strip 4 is separated from the bristles along curved parting plane 10, preferably by punching such that the free ends of the brush seal are now directed radially outward.

If it is desired to give the bristles an inclination in their mount or support, this can be achieved by arranging an orbital wrapping system revolving about the mandrels 1a, 1b at an angle with the longitudinal axis A of the apparatus. A feed motion will then be necessary between the orbital wrapping system and the assembly of the mandrels 1a, 1b.

Figure 5:
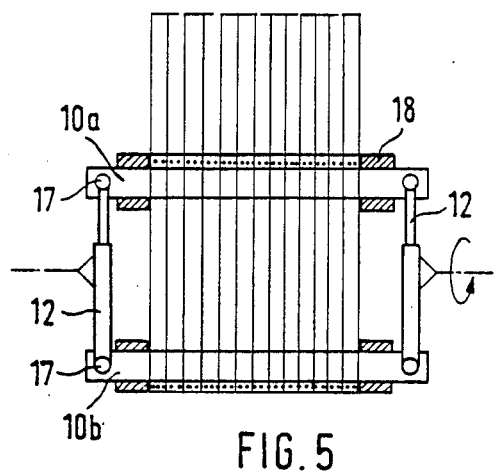
FIG. 5 schematically illustrates apparatus for wrapping filaments on a frame to produce a brush seal.
Figure 6:
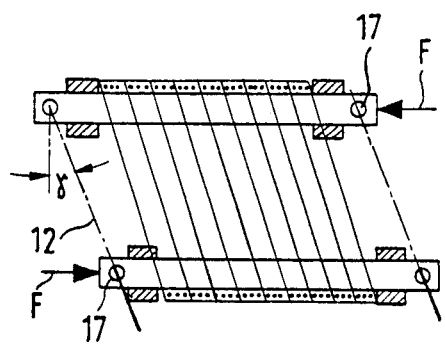
FIG. 6 illustrates the apparatus in FIG. 5 in a parallel displaced position.

FIGS. 5 and 6 show apparatus for imparting an inclination to the bristles in their mounting which includes a hinged parallelogram frame having two base beams 10a, 10b in parallel arrangement connected to one another by two telescopic cross beams 12 pivotally connected to the base beams at hinges 17. The length of the cross beams 12 is varied during displacement of the base beams 10a, 10b such that the length of the wrapped filament windings remain constant and the filament is uniformly tensioned. Mounted on the base beams 10a, 10b are stops 18 between which the filament of the packing is wrapped. FIG. 5 illustrates the wrapping position in which the base beams 10a, 10b and the cross beam 12 form a rectangle, while FIG. 6 illustrates a parallel offset position of the apparatus, in which the inclined filament packing is located on the base beams 10a, 10b or on the mandrels 1a, 1b on these beams, by slipping on clamping strips 4.

Figure 7:
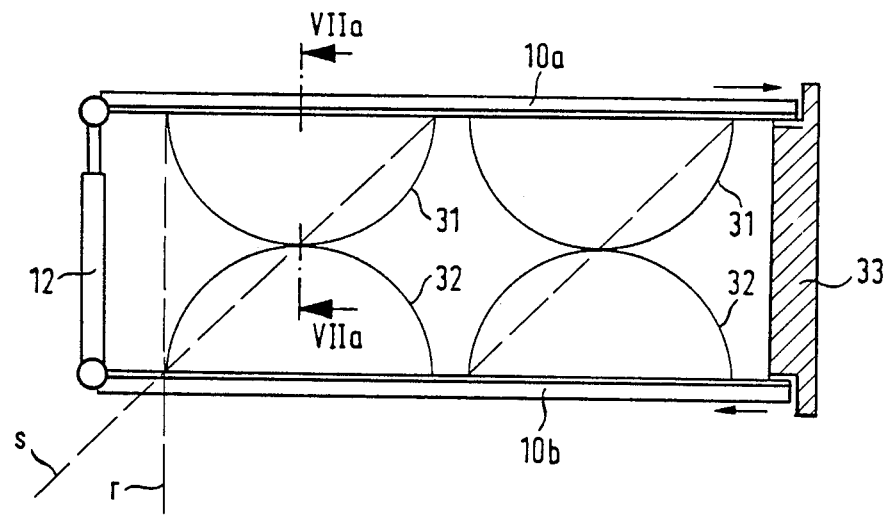
FIG. 7 is an enlarged view of apparatus similar to that in FIG. 5, with the addition of cam disks.
Figure 7A:
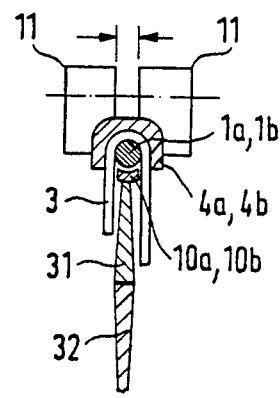
FIG. 7a is a sectional view taken on line VIIa—VIIa in FIG. 7, with the addition of clamping jaws.

An alternative to the apparatus illustrated in FIGS. 5 and 6, is shown in FIGS. 7 and 7a, respectively, which can be used to achieve inclination of the bristles in their mount. FIG. 7 shows a hinged frame having two base beams 10a, 10b in parallel arrangement pivotally connected to a cross beam 12 at the left end. At the right end, opposite cross beam 12, an end flange 33 is inserted between the two base beams 10a, 10b. Attached to the base beams 10a, 10b by their chordal edges are respective cam disks 31, 32. The cam surfaces of cam disks 31 of the base beam 10 rest on the cam surfaces of the cam disks 32 of the base beam 10b such that the base beams 10a, 10b remain in parallel alignment. In this arrangement, the cam contours of the cam disks 31, 32 are related to one another such that the length of a wrapped turn remains constant over the entire length of relative displacement travel of the beams 10a, 10b. In a preferred embodiment the cam contours are circular segmental arches. At their radially outer sides, the base beams 10a, 10b have curved recesses in which a respective mandrel 1a, 1b is accommodated. The mandrel is preferably in the shape of a wire. The filament is wrapped over the mandrels 1a, 1b, or base beams 10a, 10b in the manner described above, the wrapping direction being indicated in FIG. 7 at "r". Subsequently, the base beams 10a, 10b are offset relative to one another in parallel alignment until the filaments of the filament packing extend in the direction "s", and during the parallel relative displacement of the base beams, the cam disks 31 slide on the cam disks 32 and the cross beam 12 changes in length. After the parallel displacement of beams 10a, 10b, a clamping device composed of clamping jaws 11 (FIG. 7a) can be used to apply added pressure on the previously installed clamping strips 4a, 4b to finally and inseparably secure the end area of the filament packing in the clamping strip.

Figure 8:
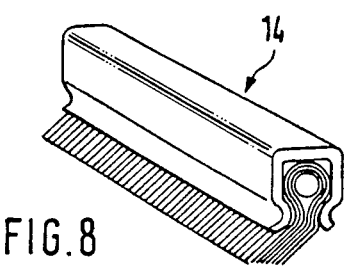
FIG. 8 is a perspective view illustrating a brush seal having inclined bristles.
Figure 9:
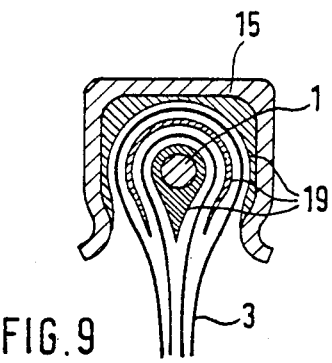
FIG. 9 is a sectional view, on enlarged scale, showing the formation, in situ, of a clamping strip on the bristles of a brush seal.

The filament packing is then divided along its median horizontal plane to produce brush shape 14 as shown in FIG. 8. With reference now to FIG. 9, a curable material or brazing paste 15 is used to secure the bristles 3 on the mandrel 1 by effectively forming the clamping strip from the curable material or brazing paste, in situ. Layers of cement or brazing sheets 19 can be inserted in the bristle material to additionally fix the bristles to one another.

The brush 14 illustrated in sectional view in FIG. 10 includes a clamping strip of hat section having rims 20. FIGS. 11 and 12 illustrate how a brush of this shape is curved using a roller bending apparatus. In particular, in FIG. 11 is seen a bending apparatus comprising two back rollers 21, nip rollers 22 and press rollers 23 coupled to rollers 22 by a common frame 24.

The nip rollers 22 and/or press rollers 23 are driven in rotation with a rolling torque M. The press rollers 23 can be urged against the nip rollers 22 with a force P2. The press rollers can simultaneously be urged together with a horizontal force Q. The rims 20 of the brush 14 are inserted between the mating pairs of rollers 22 and 23 and passed through the nip between the rollers. Then by application of force P1 on the roller frame 24, the brush 14 is pressed against the back rollers 21 and curved additionally with each pass of the rollers, for the reason that the vertical forces P1 can be absorbed only by the flanges of the brush profile, said flanges being supported vertically and horizontally by the press rollers 23. The press rollers 23 keep the hat-shaped clamping strip from corrugating.

Although the invention has been described in relation to specific embodiments of the invention, it will become apparent to those skilled in the art that numerous modifications and variations can be made within the spirit and scope of the invention as defined by the attached claims.

What is claimed is:

1. Apparatus for making a brush seal comprising a wrapping frame on which filamentary material can be wrapped to form a filament package of substantially oval section, said frame being a hinged parallelogram frame including two parallel base beams displaceable parallel to one another and cross beams coupled to said base beams to permit relative parallel displacement thereof, and means for rotating said frame about an axis to wrap material around said base beams to form said package, the wrapped material of said package being capable of being cut between said base beams to form two opposed brushes, said parallelogram frame further including means for controlling the relative displacement of the base beams parallel to one another including a pair of cam disks on each base beam, the disks on one beam resting on the disks of the other beam, said cam disks having cam surfaces which ride on one another when the base beams are displaced relative to one another and which are shaped so that the length of winding of a filament remains the same during relative displacement of the base beams.

2. Apparatus as claimed in claim 1 wherein said crossbeams are telescopic.

3. Apparatus as claimed in claim 1 wherein said base beams have outer recesses for receiving mandrels onto which the filamentary material can be wound.

4. Apparatus as claimed in claim 1 wherein the contours of the cam disks are circular segmental arches.

* * * * *